United States Patent Office 3,227,513
Patented Jan. 4, 1966

---

3,227,513
PROCESS FOR SEPARATION OF COBALT FROM NICKEL
Miroslav Alexa and Václav Reichert, Prague, Czechoslovakia, assignors to Výzkumný ústav kovu, Panenske Brezany, Czechoslovakia
No Drawing. Filed Apr. 2, 1962, Ser. No. 184,530
Claims priority, application Czechoslovakia, Apr. 8, 1961, 2,136/61
3 Claims. (Cl. 23—14)

This invention relates to the separation of cobalt from mixtures of its compounds with those of nickel.

The known methods for performing this separation on an industrial scale are unsatisfactory. The main disadvantage of these methods is the need for expensive or corrosive agent such as (chlorine). In addition, these processes require special pressure equipment for reduction or oxidation under pressure.

The method according to the German Patent No. 1,023,591 separates cobalt from nickel by conversion to complex amine compounds at pressures of 10 to 20 atmospheres and at temperatures of 93 to 170° C. with oxidation by means of oxygen or air, and at an ammonia concentration of 200 grams per liter. This process uses as a starting material a solution of sulphates of Ni and Co.

The object of this invention is a process for the separation of nickel and cobalt which is better adapted for use on an industrial scale than the known processes.

We have found that cobalt may be separated from nickel as a complex crystalline salt composed of ammonia and Co, $SO_4$, and $SO_3$ ions. In our process the oxidation of cobalt by air is performed at atmospheric pressure, at temperatures of 45 to 70° C. and at an ammonia content of 30 to 90 grams per liter.

The preferred materials for this process are the sulphides of Ni and Co, but the process may be performed under similar conditions with a solution containing nickel and cobalt sulphates. Any suitable source may be used for supplying gaseous sulphur dioxide or sulphites in ionized form to the reaction mixture.

In a specific embodiment of our process for the separation of cobalt and nickel we proceed in the following manner:

The sulphides of nickel and cobalt are prepared by chemical precipitation, and are oxidized in an aqueous solution containing per liter 15 to 80 grams, preferably 30 to 50 grams of ammonium sulphate and 30 to 90 grams, preferably 50 to 60 grams ammonia. The ammonia is added either as a gas, as a liquid, or as ammonia water, and the concentration of ammonia is maintained at the same level during the entire process. The oxidation is performed by air at a temperature of 45 to 70° C. at atmospheric pressure. The amount of air supplied is determined in accordance with the composition of the charge. The amount of cobalt and nickel in the charge is determined by the amount and quality of the sulphide precipitate. It is necessary to maintain the cobalt content within the range of 6 to 16 grams per liter. The nickel content may be at most 25 grams per liter. The presence of other metals has an important effect on the reaction, since such metals act either as positive catalysts (for instance copper) or negative catalysts (for instance iron).

During oxidation, nickel and other metals, such as Cu and Zn if present, pass into the solution as sulphate amine complex salts. Cobalt also temporarily passes into the solution, but is later converted into a complex crystalline salt. The formation of this salt requires the presence of sulphite ions in the solution which are available from the oxidation of sulphides through an intermediate stage of sulphur oxidation. The complex cobalt salt has a limited solubility even at elevated temperature, and its crystals are formed therefore during the reaction. The solubility of the complex cobalt salt is further decreased when the solution is cooled to 3 to 8° C. After completion of the reaction the crystals of the complex cobalt salt are removed from the remainder of the solution by means of a centrifugal separator in which they are also washed.

When the raw material contains sulphides of cobalt and nickel in a proportion of 10 parts cobalt to 15 parts nickel, we obtain cobalt in the form of its complex salt as a process yield of 78 to 89%. Per 10 parts of cobalt in the complex salt, 0.05 to 0.15 part of nickel are present. The content of nicked is therefore reduced 300 to 100 times. The complex salt contains 18 to 21% cobalt and 0.1 to 0.3% nickel. The amount of nickel in the complex crystals depends upon the nickel concentration in the mother liquor and upon the removal of mother liquor by washing with water. It is possible to obtain the cobalt salt practically free of nickel by recrystallization.

The composition of the cobalt salt is:

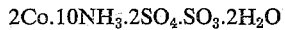

In an industrial manufacturing process, it may be converted to cobalt sulfate by roasting and the $SO_2$ and $NH_3$ thereby liberated may be returned to the manufacturing cycle. When the complex cobalt salt is roasted at higher temperature, it is converted directly to oxides of cobalt. When a recrystallized salt is roasted, the oxides are of high purity.

This process of separating cobalt and nickel was originally developed on a laboratory scale, but has been subsequently applied on an industrial scale with good results.

We claim:
1. A process of separating cobalt and nickel which comprises:
   (a) oxidizing the sulphides of cobalt and nickel by means of air at normal pressure and at a temperature of 40° C. to 70° C. and in the presence of sulfite ions in an aqueous medium containing, per liter, between 15 and 80 grams ammonium sulphate and between 30 and 90 grams ammonia until a crystalline compound of the composition

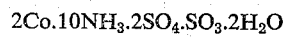

is formed,
      (1) said sulphides of cobalt and nickel being present in said medium in amounts sufficient to make the cobalt content of said medium between 6 and 16 grams per liter, and the nickel content not more than 25 grams per liter; and
   (b) separating said crystalline compound from said medium.
2. A process as set forth in claim 1, which further comprises roasting said crystalline compound until the same is converted to a soluble cobalt sulphate.
3. A process as set forth in claim 1, which further comprises roasting said compound until the same is converted to a cobalt oxide.

References Cited by the Examiner
UNITED STATES PATENTS

| | | | |
|---|---|---|---|
| 2,647,819 | 8/1953 | McGauley | 23—117 |
| 2,728,636 | 12/1955 | Van Hare et al. | 23—117 |
| 2,767,055 | 7/1956 | Schaufelberger | 23—117 |

BENJAMIN HENKIN, *Primary Examiner.*

MAURICE A. BRINDISI, *Examiner.*

E. C. THOMAS, *Assistant Examiner.*